L. A. HOERR.
BRAKE ROD JAW.
APPLICATION FILED AUG. 6, 1910.
977,629.
Patented Dec. 6, 1910.
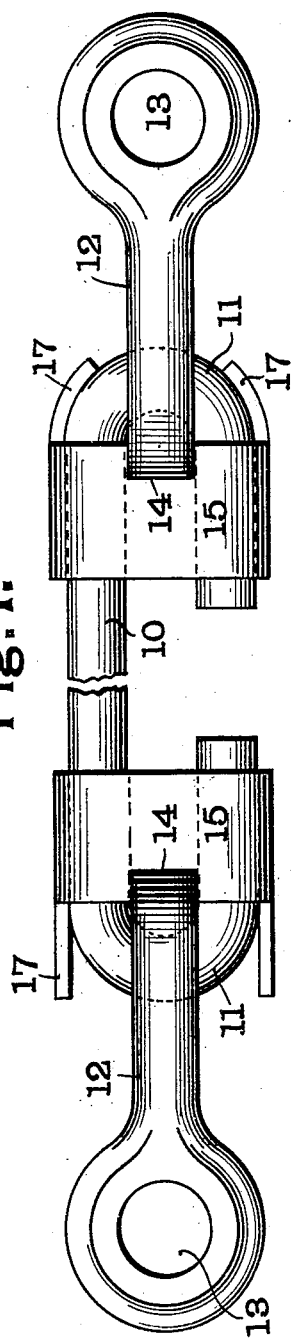
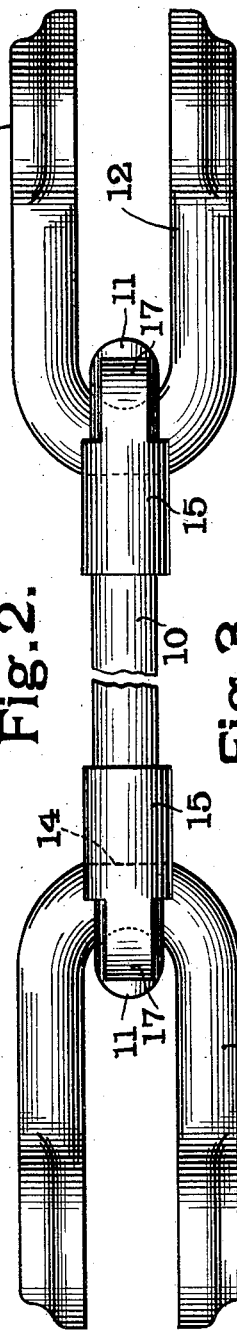
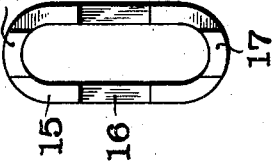
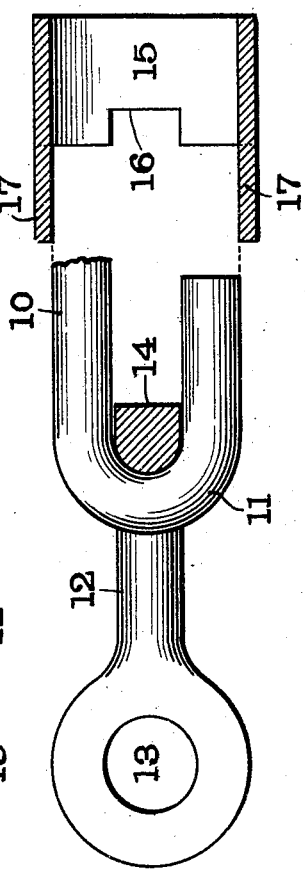
INVENTOR
Louis A. Hoerr

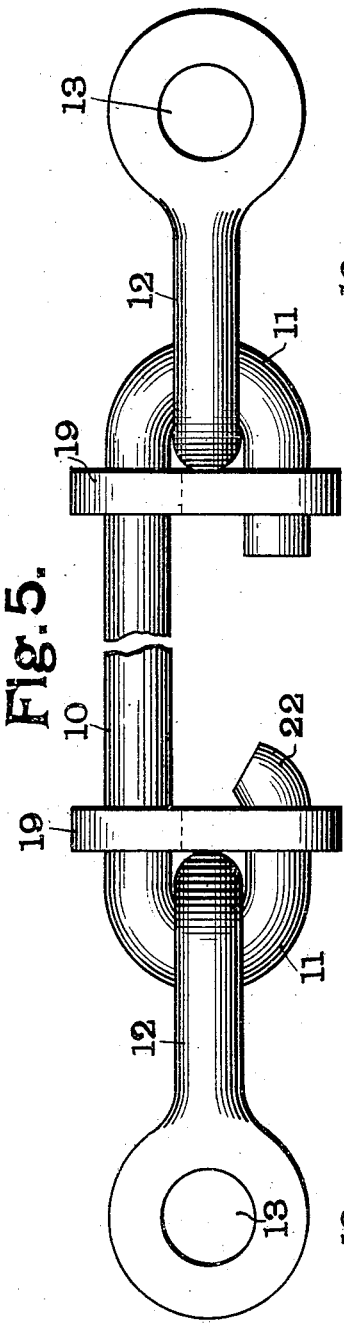
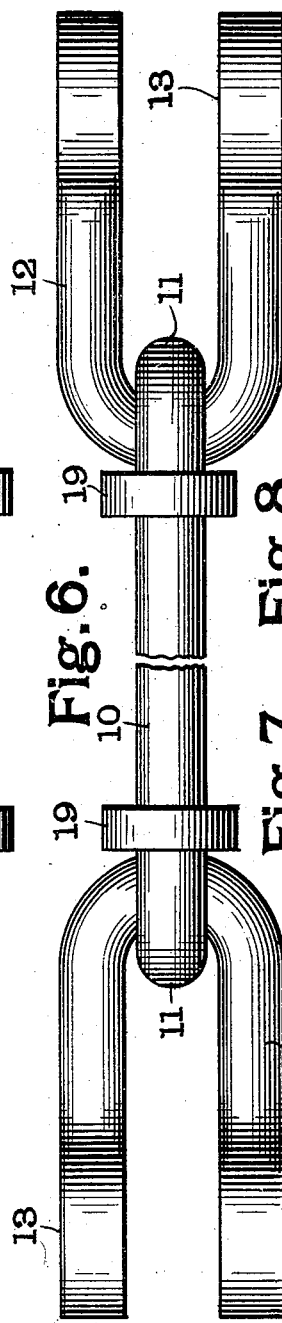
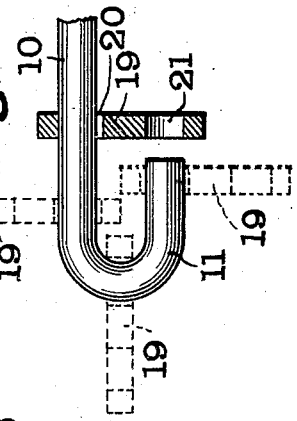
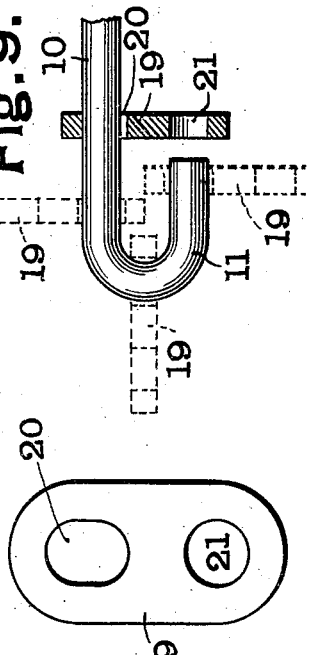
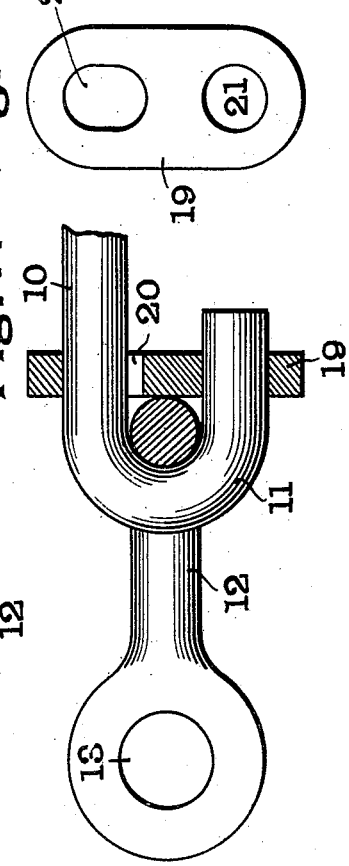

UNITED STATES PATENT OFFICE.

LOUIS A. HOERR, OF ST. LOUIS, MISSOURI.

BRAKE-ROD JAW.

977,629.  Specification of Letters Patent.  Patented Dec. 6, 1910.

Application filed August 6, 1910. Serial No. 575,873.

*To all whom it may concern:*

Be it known that I, LOUIS A. HOERR, a citizen of the United States, residing at St. Louis, Missouri, have invented a certain new and useful Brake-Rod Jaw, of which the following is such a full, clear, and exact description as will enable any one skilled in the art to which it appertains to make and use the same, reference being had to the accompanying drawings, forming part of this specification.

Heretofore brake rod jaws have usually been formed with a pair of passages in the shank of the jaw for receiving the sides of a loop formed in the brake rod. One objection to such construction is that it is necessary to form the loop in at least one end of the rod after the straight end has been passed through one of the passages. This necessitates the making of the loop by hand by the person assembling the brake with the result that the length of the brake rod cannot be accurately determined as the loop cannot be made with any degree of accuracy by hand. Another objection to this construction is that the form of brake rod jaw is so complicated that it must necessarily be cast and hence cannot be made of material of sufficient hardness to withstand the great wear on the jaw. Another objection is that the removal of a broken and replacing of a good jaw is attended with great difficulty owing to the necessity of straightening the loop in the rod.

The object of my invention is to overcome the difficulties above referred to and this I accomplish by providing the brake rod jaw with a separate retaining member adapted to engage with the loop and lock the jaw in position.

In the accompanying drawings which illustrate two forms of brake rod jaw made in accordance with my invention, Figure 1 is a plan view showing my preferred construction; Fig. 2 is a view taken at right angles to Fig. 1; Fig. 3 is a sectional view; Fig. 4 is an end view of the retaining member; Fig. 5 is a view similar to Fig. 1 but showing a modification; Fig. 6 is a view taken at right angles to Fig. 5; Fig. 7 is a sectional view; Fig. 8 is an end view of the retaining member shown in Figs. 5, 6 and 7, and Fig. 9 is a view showing the manner of placing the retaining member on the brake rod.

Like marks of reference refer to similar parts in the several views in the drawings.

10 represents the brake rod. This brake rod 10 is provided at each end with an open loop 11 which may be formed on the rod by machine at the shops so that the loops may be made uniform in size and the rods may be uniform in length. Engaging with the loops 11 are the jaws 12. These jaws 12 are provided at their ends with a pair of passages 13 for the pins pivoting the jaws to the brake beams. The inner end of the jaws 12 are each provided with a square end 14 as shown in Figs. 1 and 3. It will be seen that the jaws 12 are of such simple construction that they may be readily formed by drop forging.

In order to hold the jaws 12 in position I provide a retaining member 15 which is link-shaped, as best shown in Fig. 4, and of sufficient size to slide easily over the loop 11. Each of the retaining members 15 is provided with a recess 16 adapted to engage the square end 14 of the jaw 12. Each of the retaining members is also provided with a pair of fingers 17 adapted to be bent around the end of the loop 11 as best shown in Fig. 1 so as to lock the retaining member in position. The retaining member 15 should be made of malleable casting or other suitable material to allow the fingers 17 to be bent without breaking. It will be evident that the retaining member firmly locks the jaws 12 against longitudinal movement and that the engagement of the square end 14 with the recess 16 practically prevents movement of the jaw in the direction of the plane of the length.

If it is desired to replace a broken jaw it is only necessary to straighten the fingers 17 and slide the retaining member back along the brake rod 10 in order to allow the new jaw to be substituted.

In Figs. 5 to 9 I have shown a slight modification. In the modification shown in these figures the rod 10 is similar to the rod shown in Figs. 1 to 4. The jaws 12 are also similar except that I have shown them as somewhat simpler in outline. The square end of the jaw may also be omitted if desired, as shown in these figures. The principal difference in the construction shown in these figures from that above described is that in place of the retaining member 15 I employ a retaining member 19 which may be formed by stamping. This member 19 consists of an oblong piece of metal with rounded ends having a pair of passages 20 and 21 respectively. The passage 20 is somewhat linked as best shown in Fig. 8, while the passage 21 fits the rod 10 rather snugly. In placing the retaining member 19 on the rod 10 it is moved around the loop 11, as shown by the different dotted line positions in Fig. 9. It is in order to allow the member to pass freely around the curve in the loop that the opening 20 is linked as shown in Fig. 8. After passing the retaining member around to the position shown in full lines in Fig. 9 the jaw 12 is placed in position and the retaining member is moved up against the jaw, as shown in Figs. 5 and 6. In order to lock the retaining member in position it is necessary to slightly bend the end of the rod, as shown at 22 in Fig. 5. In order that only a slight bend may effectively lock the member in position the opening 21 is made to snugly fit the rod as hereinbefore described.

The construction shown in Figs. 5 to 9 has the disadvantage that the rod itself must be bent to lock the retaining member and consequently a new jaw cannot be replaced as easily as in the construction shown in Figs. 1 to 4. The construction shown in Figs. 5 to 9, however, is somewhat cheaper and contains most of the advantages of my preferred form.

Having fully described my invention, what I claim as new and desire to secure by Letters Patent of the United States, is:

1. The combination with a brake rod having an open loop on the end thereof, of a brake rod jaw adapted to link with the said loop, and a retaining member engaging with said loop to hold said jaw against longitudinal movement relative to said rod.

2. The combination with a brake rod having an open loop on the end thereof, of a brake rod jaw adapted to link with said rod, and a retaining member adapted to slide on said loop and hold said jaw against longitudinal movement relative to said rod.

3. The combination with a brake rod having an open loop on the end thereof, of a brake rod jaw adapted to link with said loop, a loop-shaped retaining member surrounding said loop and holding said jaw in position, and means carried by one of the former parts and engaging with the other to secure said retaining member in position to hold said jaw against longitudinal movement relative to said rod.

4. The combination with a brake rod having an open loop on the end thereof, a brake rod jaw adapted to link with said loop, a retaining member engaging said loop and holding said jaw against longitudinal movement, said retaining member being provided with a recess engaging the end of said jaw and preventing movement of the jaw in the place of the loop, and locking means for said retaining member.

5. The combination with a brake rod having an open loop in the end thereof, of a brake rod jaw adapted to link with said loop, a link-shaped retaining member surrounding said loop, said retaining member being provided with a recess engaging the end of said jaw, and locking means carried by said retaining member.

6. The combination with a brake rod having an open loop in the end thereof, of a brake rod jaw adapted to link with said loop, a link-shaped retaining member surrounding said loop, said retaining member being provided with a recess engaging the end of said jaw, and arms carried by said retaining member and adapted to be bent around the end of said loop to lock said retaining member in position.

In testimony whereof, I have hereunto set my hand and affixed my seal in the presence of the two subscribing witnesses.

LOUIS A. HOERR. [L. S.]

Witnesses:
W. A. ALEXANDER,
LAURENCE L. MEAD.